United States Patent [19]

Agosta

[11] Patent Number: 4,468,127
[45] Date of Patent: Aug. 28, 1984

[54] PROCESS FOR METERING AND MIXING LIQUIDS IN ARBITRARY MASS PROPORTIONS

[76] Inventor: Vito Agosta, 42 Cherry La., Huntington, N.Y. 11743

[21] Appl. No.: 411,851

[22] Filed: Aug. 26, 1982

Related U.S. Application Data

[63] Continuation of Ser. No. 183,216, Sep. 2, 1980, abandoned.

[51] Int. Cl.³ .............................................. B01F 5/00
[52] U.S. Cl. ................................... 366/150; 137/114; 137/893; 366/182
[58] Field of Search ...................... 366/150, 163, 2, 3, 366/6, 10, 16, 17, 131, 132, 160, 151, 341, 348, 134, 182; 137/888, 88, 114, 889, 892–894, 98, 3, 7; 123/575–578, 180 R, 180 AC, DIG. 12

[56] References Cited

U.S. PATENT DOCUMENTS

| | | | |
|---|---|---|---|
| 1,452,265 | 4/1923 | Collins et al. | 137/7 |
| 2,707,964 | 5/1955 | Monroe | 137/7 X |
| 4,123,800 | 10/1978 | Mazzei | 366/150 |
| 4,275,752 | 6/1981 | Collier et al. | 137/7 |

*Primary Examiner*—Robert W. Jenkins
*Attorney, Agent, or Firm*—Kane, Dalsimer, Kane, Sullivan & Kurucz

[57] ABSTRACT

A method and apparatus is provided for obtaining mixtures in predetermined proportions of a primary liquid and secondary liquid while the stagnation pressure and mass flow of the primary liquid are varying. The apparatus comprises a passive device having a passageway extending therethrough. A first section of the passageway for receiving the primary liquid has a decreasing area. A second section of the passageway for receiving the secondary liquid has an area substantially equal to the minimum area of the first section.

7 Claims, 12 Drawing Figures

PROCESS FOR METERING AND MIXING LIQUIDS IN ARBITRARY MASS PROPORTIONS

This is a continuation of application Ser. No. 183,216, filed Sept. 2, 1980, now abandoned.

BACKGROUND OF THE INVENTION

The present invention relates to fluid control and in particular to liquid-liquid mixtures.

Liquid-liquid mixers have been used by such diverse groups as the chemical process industries and by home owners in dispensing liquid fertilizer. In general the systems heretofore available are directed toward producing constant liquid-liquid volume ratios, see for example U.S. Pat. No. 3,188,055. In chemical process industries where liquid streams are proportionately mixed, deviations in constant liquid-liquid ratios occur due to the valve and nozzle flow characteristics controlling the streams or due to pressure deviations in the regulating valves. In these systems the pressure proportionate band is inherently fixed to the pressure of the primary liquid to which one or more liquids are to be mixed as well as the mass of the liquids flowing.

A problem exists in the utilization of the mixtures of certain liquid fuels, such as synthetic or biomass fuels and fuel oils, which are to be used in existing energy systems such as boilers and engines. In these cases the stagnation pressure and/or mass flow of the fuels is modulated depending on load demands. In order to operate these energy systems efficiently, and in order to maintain or extend the range of the operating characteristics of these systems as well as to optimize the performance of these systems while utilizing fuel mixtures, the liquid-liquid mixture ratios must be varied according to the operating characteristics of the energy devices. As a result, a need has arisen for an improved liquid-liquid mixing device capable of providing liquid mixtures in any predetermined proportions (within determined limits) while both the stagnation pressure and mass flow of the primary liquid are varying.

In view of the above, it is the principal object of the present invention to provide an improved mixing process and mixing device for attaining the above result.

It is a further object of this invention to provide a process and apparatus which can be completely passive and requires no external power or signal source.

Another object of this invention is to be able to inject a secondary liquid at low stagnation pressure into a primary liquid at high stagnation pressure.

A still further object of this invention is to provide a process and apparatus which can be incorporated into existing vehicles or power plants with a minimum of downtime or expense.

Yet another object of this invention is to provide an active means to adjust the stagnation pressures of the secondary liquids such that a completely arbitrary metering-mixing ratio schedule is achieved with varying mass flow and/or stagnation pressure of the primary liquid.

SUMMARY OF THE INVENTION

The above and other beneficial objects and advantages are attained in accordance with the present invention by providing a method for obtaining through a passive device various liquid-liquid mixture ratios of a primary liquid and secondary liquids during pressure and mass flow modulation of the primary liquid. The passive device includes a first section so dimensioned that a significant decrease in pressure occurs in the primary liquid as it flows through the first section. A second section, essentially constant in cross section or of gently varying cross sectional area, is connected to the first section with smooth transition. A decrease in pressure occurs in the flowing primary liquid which value is dictated by the Bernoulli equation and adjusts to account for any viscous and mixing losses. The pressure defect in the minimum area section of the device, usually called the velocity head, varies with the mass of the primary liquid flowing therein. One or more secondary liquids are introduced into the minimum area section at prescribed stagnation pressures. The mass of the secondary liquid flowing into the minimum area is dependent on its stagnation pressure, the pressure defect in the minimum area section due to the flowing primary liquid, the secondary orifice area, the included angle of these streams, and any drag element that is positioned in the flow passage of the secondary liquid. If the mass flow rate of the primary liquid is varied, the pressure defect in the minimum area section varies, non-linearly, and thus the mass flow of the secondary liquid varies. By prescribing the stagnation pressure of the secondary liquid, the secondary orifice area, the included angle of these streams and the flow characteristics of the drag element, the mass flow ratio of the two streams can be varied in an arbitrary manner as the mass flow in the primary stream varies. By suitable selection of the aforesaid parameters, the mass flow ratio of the secondary to primary streams can be constant, or varying and linear, or not constant and non-linear. One or more of the secondary streams can be comprised of a powder such as pulverized coal or a slurry of a powder and liquid. In addition, the primary and secondary streams can be interchanged such that a slurry flows in the primary stream, and a liquid is injected as the secondary stream. Finally, the stagnation pressure of the secondary liquid can be less than the stagnation pressure of the primary liquid and these streams can still be made to mix by a suitable selection of the aforesaid parameters.

If required, a third section may follow the minimum section. The shape of the third section is dictated by the needs of the mixing process. For example, if pressure recovery is required, the third section can be a truncated cone, the smaller portion matching the minimum area section of the device and the aft portion, downstream, made larger as dictated by the Bernoulli Law. Similarly, if the purpose of the mixing of the liquids is so that they can react chemically, then the aft portion of the third section may be of such shape as dictated by the laws of aerothermochemistry.

DETAILED DESCRIPTION OF THE PREFERRED EMBODIMENTS

As stated, the present invention relates to a process and apparatus for metering and mixing two or more liquids in any proportionate mass ratios. While the following descriptions are directed toward the metering and mixing of oil and alcohol, it should be understood at the outset that the present invention can be applied to any number of liquids in addition to those of the described embodiments. It should be further understood that the liquids of the mixture may be miscible or non-miscible, chemically reacting or non-reacting, and that the term "liquid" includes slurries, gels and thixiotropic materials.

Figure 1:
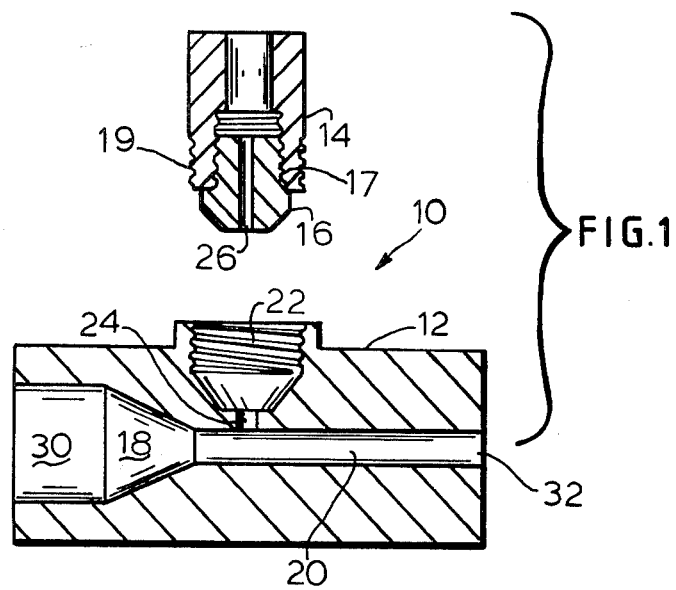
FIG. 1 is an exploded side elevational sectional view of a two section metering-mixing device in accordance with the present invention.

Reference is now made to FIG. 1 wherein an apparatus 10 is shown which is comprised of an elongated body member 12, a second body member 14, and a third body member 16. The body member 12 includes a convergent passage 18 formed therein and defining a first section which is connected to a minimum area passage 20, also formed in member 12. The passage 20 defines a second section of apparatus 20 which is coaxial with the first section. A transverse recess 22 extends through member 12 with the axis of recess 22 intersecting that of the first and second sections. An aperture 24 at the base of recess 22 connects recess 22 with passage 20 as shown.

Member 16 is provided with an external thread which mates with a threaded bore 17 in member 14. An exterior thread 19 on member 14 permits that member to be mounted to threads in recess 22.

While the member 12 may be generally cylindrical to facilitate fabrication and assembly, other cross sectional configurations may be used where design considerations warrant the added expense in forming such configurations. This is also true for the passages 18 and 20.

The aperture 24 may be positioned perpendicular to the axis of passage 20 as shown, or its axis may be at an angle to the axis of passage 20. Further, the axis of aperture 24 may be displaced from the axis of passage 20, the position being determined by design considerations and the laws of fluid dynamics, particularly the conservation of mass flow and Bernoulli's equation.

Body member 16 includes an orifice 26. As noted, member 16 screws into a nozzle holder defined by body member 14. A bore through member 14 aligns with a bore in member 16 that terminates in orifice 26. The nozzle 16 and nozzle holder 14 together form a nozzle 15 which screws into the recess 22 in body 12 in the manner described.

The operation of the metering-mixing apparatus 10 is set forth below. A first liquid, such as oil enters member 12 at the entrance 30 and leaves through exit 32. The pressure of the oil decreases as it flows in the convergent section 18, the amount of pressure decrease being dependent on the area ratios of the entrance 30 and minimum section 20, and the quantity of mass of oil flowing. If the mass of oil flowing increases, the pressure decrease at the minimum section 20 becomes greater. In particular, for constant area ratio of the convergent section and constant stagnation pressure of the primary liquid, the pressure at the minimum section 20 decreases as the oil mass flow increases. In this case, there occurs a modulating primary mass flow with constant primary stagnation pressure.

The secondary liquid flows into mixing apparatus 10 through the nozzle 16, which is located in its place in the recess 22. If the stagnation pressure of the secondary liquid is equal to that of the primary liquid, then theoretically the mass ratio of the primary to secondary liquids is equal to the area ratio of the minimum section 20 to the orifice 26. As the primary mass flow increases for constant stagnation pressure, the static pressure in the minimum section decreases, which causes the mass flow of the secondary liquid to increase. Although the pressure-mass flow relationship is non-linear, in this case a linear metering ratio is achieved, thus this metering ratio remains constant as the mass flow of the primary liquid modulates.

If the stagnation pressure of the primary liquid remains constant as the primary mass flow modulates, and the stagnation pressure of the secondary liquid is different from that of the primary liquid it is expected that the metering ratios will be non-linear. However, several synergistic effects were discovered with the described construction which are particularly beneficial in the application of the apparatus to engage systems. For the case where the stagnation pressure of the secondary liquid is greater than that of the primary liquid, it is found that the liquid mass ratios of the secondary to primary streams increase as the primary liquid mass flow decreases. In addition, the slope of mass ratio changes with the secondary liquid stagnation pressure. Conversely, for the case where the stagnation pressure of the secondary liquid is less than that of the primary liquid, it is found that the secondary to primary streams mass ratio decreases as the primary liquid mass flow decreases. In addition, secondary stream mass flow shut off can be hydrodynamically designed into the system by the appropriate selection of the aforesaid operating parameters. It was further found that by placing a drag element in the nozzle orifice 26 which is sensitive to the stream velocity of the secondary liquid, flow regimes of linear followed by non-linear behavior can be obtained for the case where the stagnation pressures of both streams are equal. Thus, for a fixed stagnation pressure of the primary liquid and with mass flow modulation of the primary liquid, both linear and non-linear operating loci of liquid=liquid metering ratios are obtained as the primary liquid modulates in mass flow. These operating loci are discrete. In addition, by varying the stagnation pressure of the primary liquid, the whole field of liquid metering ratios is obtained as the stagnation pressure and mass flow of the primary liquid modulates. In FIG. 1, where the primary and secondary liquid streams are normal to each other, the degree of mixing between the liquids is enhanced by the primary liquid shearing the secondary liquid as it passes by the nozzle orifice 26 in the minimum section 20. The degree of mixing can be changed by changing the stream velocities of the liquids or by changing the value of the included angle between the streams (i.e., by having the nozzle axis make some angle other than 90° with the axis of body 12).

However, by changing the included angle between the streams, the relationship between the stagnation states and flow properties vary, producing again diverse mixing characteristics and concomitant liquid-liquid metering ratio operating loci as the mass of the primary stream modulates.

With such a wide latitude in achieving these metering-mixing ratios, the operating characteristics of many modulating energy systems can be matched when various substances of different thermochemical properties are substituted therein. The more common of these energy systems are boilers and engines in which mixtures of alternate fuels are introduced into a primary fuel.

Figure 2:
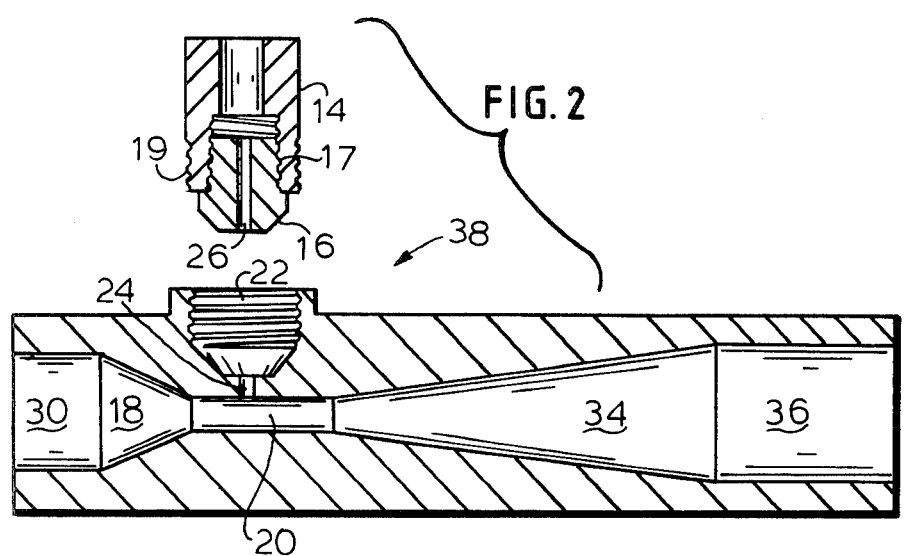
FIG. 2 is a side elevational sectional view of the metering-mixing device of FIG. 1 followed by a third section of increasing cross sectional area in accordance with an alternative embodiment of the present invention.

In FIG. 2 a second embodiment of a metering-mixing device 38 is shown. The device 38 is similar to that shown in FIG. 1, except that a divergent third passage 34 is added aft of passage 20 defining a third section. In this case, the static pressure of the mixed liquids increases as the flow velocity decreases and exits at 36 the outlet of passage 34. In addition, chemical reactions between the two liquids can be timed to occur in the divergent section 34. The remainder of device 38 is identical to that of device 10 and identical reference numerals have been applied to like parts.

Figure 3:
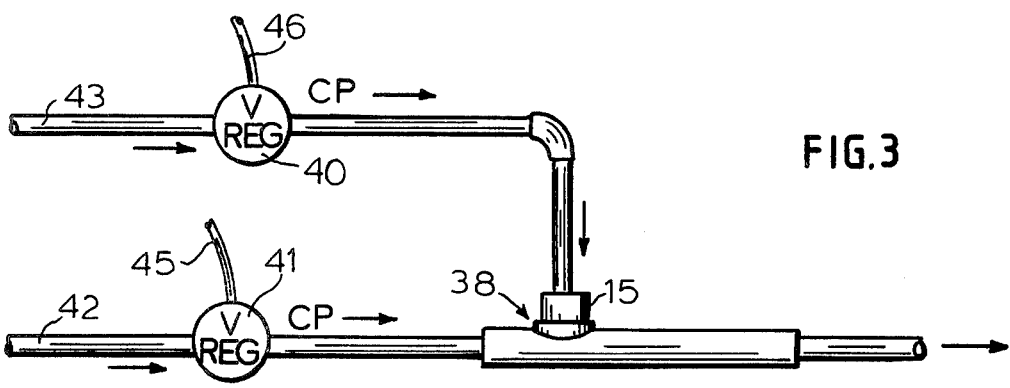
FIG. 3 is a schematic flow diagram of the process of the present invention with means to vary the stagnation pressures of the primary and secondary liquids from external arbitrary source signals.

FIG. 3 is a schematic flow diagram for device 38 with means to vary the stagnation pressure of of the primary and secondary liquids. The primary liquid, such as oil, flows through a pipe 42, thence through a pressure regulating valve 41, and into the metering-mixing device 38. The secondary liquid, such as alcohol, flows through a pipe 43, thence through a reducing valve 40 and into the nozzle assembly 15 of the metering-mixing device, 38. Independent control and operation of the pressure regulating valves 40 and 41 is provided so that the stagnation pressures of the primary and secondary liquids can be varied arbitrarily. In addition, means are provided to dynamically actuate the pressure regulating valves 40 and 41 by feeler lines 45 and 46 obtained from arbitrary and external signal sources. The pressure regulating valves can also be dynamically operated electromechanically from electric source signals as may be generated from mass flow transducers.

Figure 8:
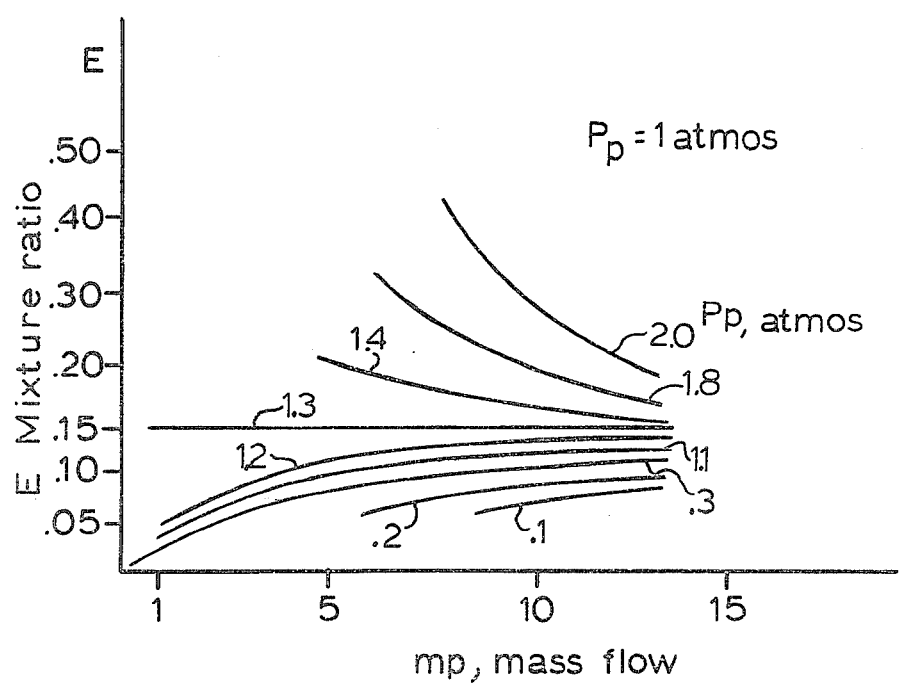
FIG. 8 is a graph of the operating characteristics of a metering-mixing module in which the stagnation pressure of the primary liquid remains constant, and the stagnation pressure of the secondary liquid is parametrically varied as the mass flow of the primary liquid varies; and, FIGS. 9 a, b and c depict the operating loci for a metering-mixing module in which the operating parameters are varied.
Figure 9A:
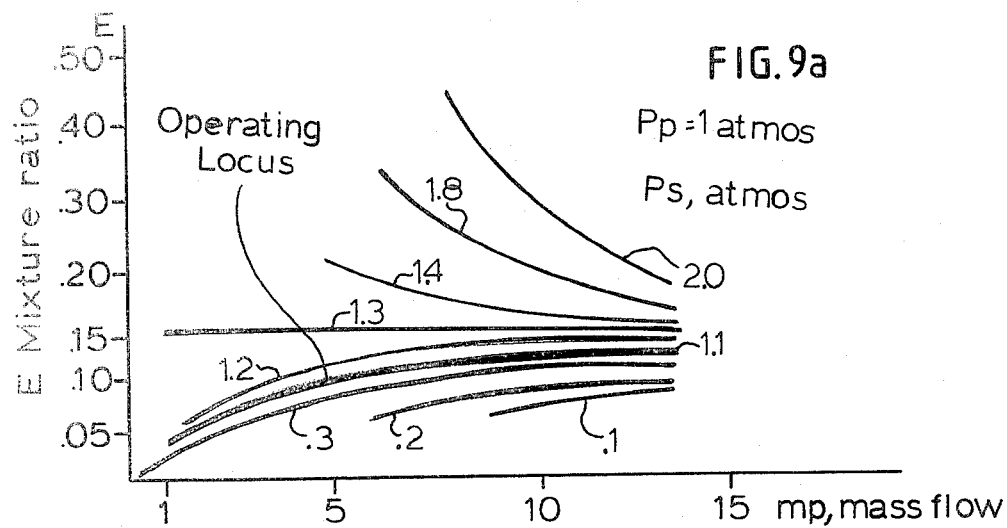
Figure 9B:
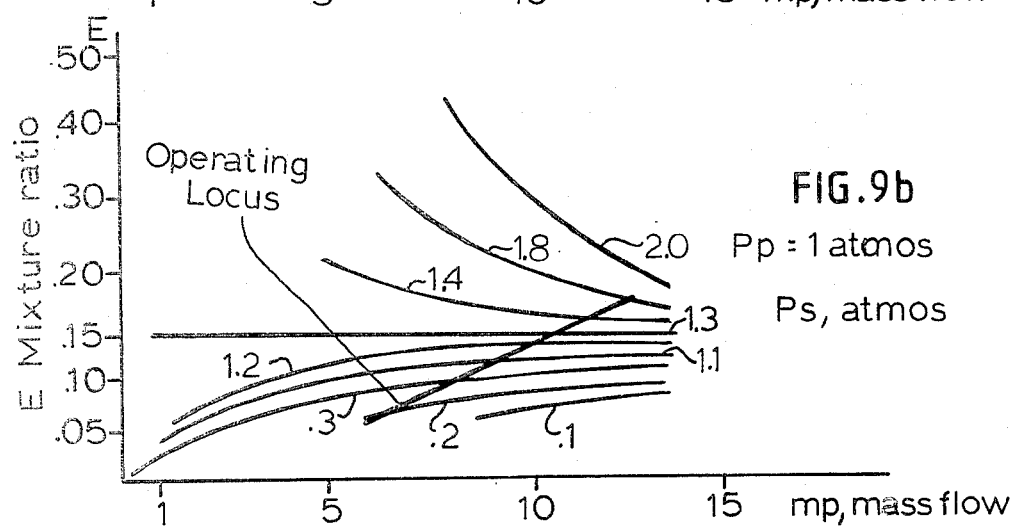
Figure 9C:
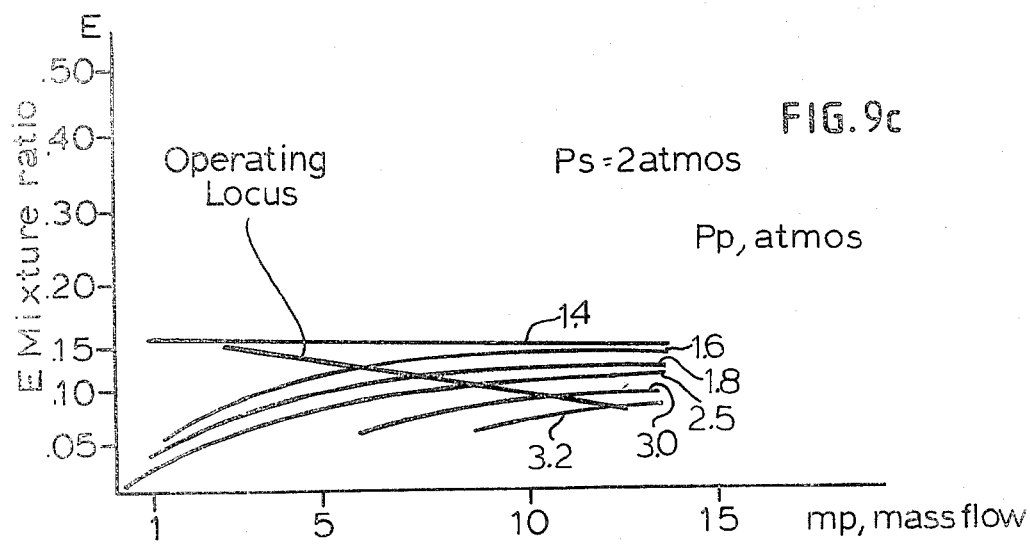

In a successful practice of the present invention, alcohol was metered and mixed with No. 2 Diesel Oil. The stagnation pressure of the primary liquid; i.e. No. 2 Diesel Oil, was maintained constant. A parametric experimental study was pursued in which the stagnation pressure of the secondary liquid was varied and the mass flow of the primary liquid was modulated. The metering mixing device was six inches long with entrance and exit cone angles of 60° and 15° respectively and throat bore of 0.100 inch. The nozzle was a standard Monarch nozzle, 30 gallons per hour with 60° cone angle. The operating loci of the metering-mixture curves are illustrated in FIG. 8. The curves were translated upward and to the right as the stagnation pressure of the secondary liquid was increased. Thus, for a fixed primary stagnation pressure, a family of curves as shown in FIG. 8 results. By varying the primary liquid stagnation pressure a group of families of curves superpose, one group per primary liquid stagnation pressure. Several options exist for metering-mixing operation: (a) fix both stagnation pressures and obtain one operating locus, FIG. 9a; (b) fix the primary liquid stagnation pressure and vary the secondary liquid stagnation pressure and obtain a group of curves, and the operating mixture ratio locus would thus intersect the curves in the group, FIG. 9b. In addition, it is seen that it is possible to inject a secondary liquid into a primary liquid, the former having the lesser stagnation pressure; (c) fix the secondary liquid stagnation pressure and vary the primary stagnation pressure, FIG. 9c. In this case, a behavior similar to case (b) is observed; and (d) vary the stagnation pressures of the primary and secondary liquids from external independent source signals. An arbitrary operating locus results depending on the primary liquid mass flow schedule, and the individual stagnation pressure schedules for the various liquids.

Figure 4A:
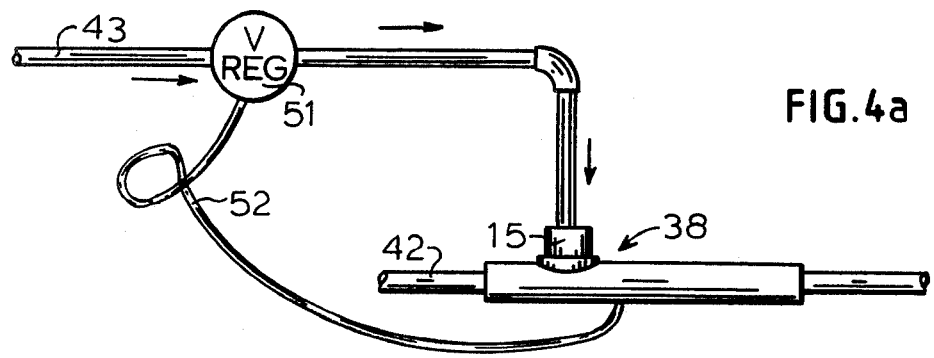
FIG. 4a is a schematic flow diagram in which the stagnation pressure of the secondary liquid is varied according to the varying static pressure of the primary fluid.
Figure 4B:
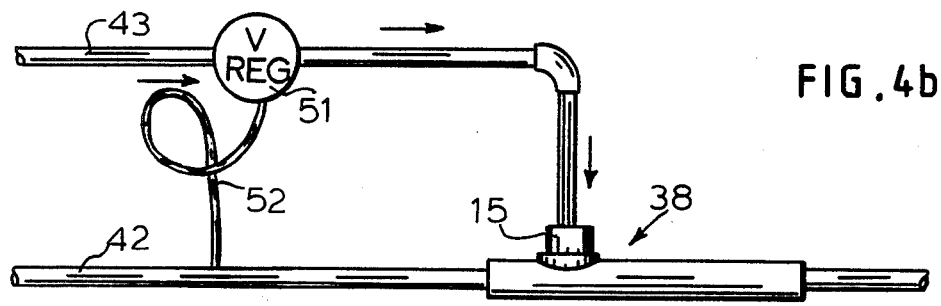
FIG. 4b is a schematic flow diagram in which the stagnation pressure of the secondary liquid is varied according to the static stagnation pressure of the primary fluid.

FIGS. 4a and 4b are schematic flow diagrams in which the stagnation pressure of the secondary liquid is varied by a pressure regulating valve. Thus, in FIG. 4a, the secondary liquid (i.e., alcohol) flows in pipe 43 into valve 51 in which the stagnation pressure decreases, and thence to the nozzle assembly 15 of the metering-mixing device 38. The regulating valve 51 may contain a pressure loaded chamber, or a spring chamber that can be pressure loaded. The feeler line 52 is attached to the primary liquid (i.e., oil) section 20 of the metering-mixing module 38, so that it senses the oil static pressure. Thus, the stagnation pressure and mass flow of the secondary liquid varies as the static pressure and mass flow the primary liquid.

In FIG. 4b, a system similar to FIG. 4a is shown with the difference that the feeler line 52 is attached so that it senses the stagnation pressure of the primary liquid in the pipe 42. Thus, in the case depicted in FIG. 4a the operating locus can follow a curve in the groups shown in FIG. 9a and 9b, and in the case depicted in FIG. 4b the operating locus follows essentially that shown in FIG. 9a.

Figure 5:
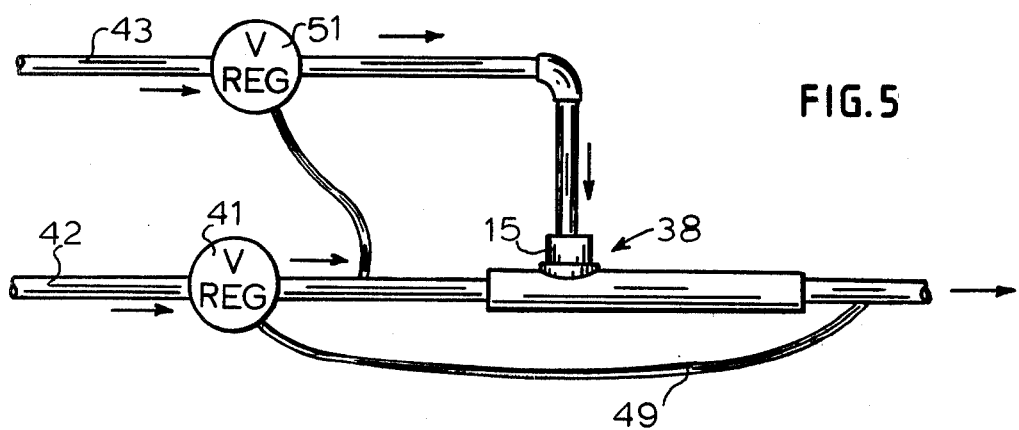
FIG. 5 is a schematic flow diagram in which the stagnation pressure of the primary liquid is varied according to the static/stagnation pressure recovery after the metering-mixing device; i.e. feedback loop, and in which the stagnation pressure of the secondary liquid is varied according to the static/stagnation pressure of the primary liquid.

In FIG. 5, a schematic flow diagram of a feedback loop control system is illustrated. In this case the primary liquid flows in pipe 42 through the pressure regulating valve 41, through the metering-mixing module 38, and thence exits to an energy or alternate system downstream. A sensor 49 is placed at the exit of the metering-mixing device which signal modulates the flow of the primary liquid. The secondary liquid flows in pipe 43 and is pressure modulated by valve 51 which varies the mass flow through the nozzle assembly 15. The modulation signal for the secondary liquid is obtained downstream of the pressure regulating valve 41 of the primary liquid. The operating locus follows essentially that shown in FIG. 9c.

Figure 6:
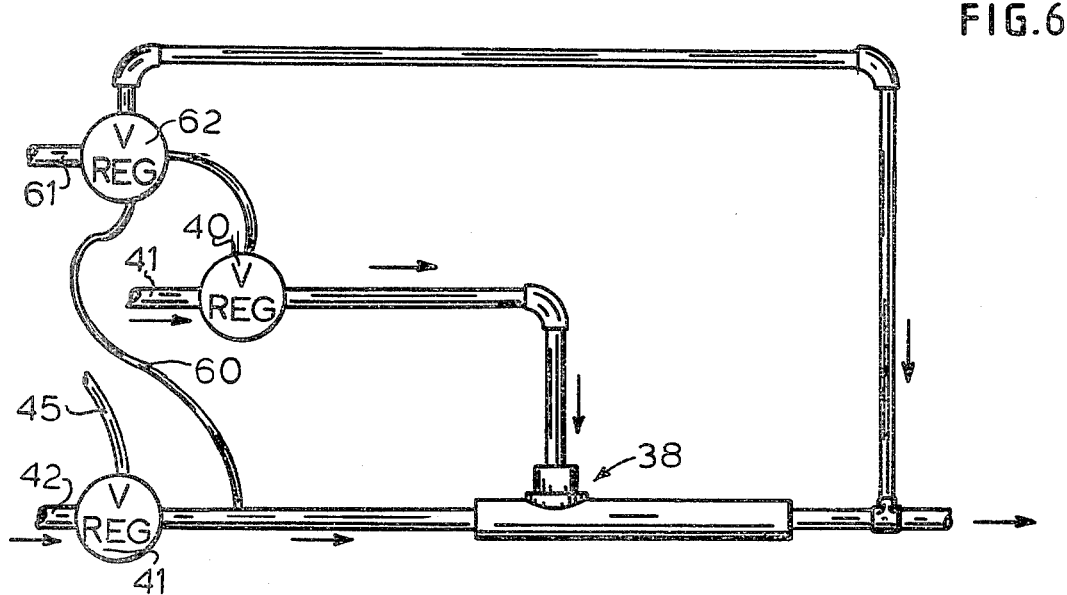
FIG. 6 is a schematic flow diagram in which the stagnation pressure of the primary liquid is varied from an external source and the pressure of the secondary liquid is varied as a function of both an arbitrary souce modified by the pressure in the primary liquid.

In FIG. 6, a modification of the flow diagram of FIG. 5 is shown in which the stagnation pressure of the secondary liquid is modulated by an arbitrary external signal in line 61 through the back pressure regulating valve 62 and tempered by a signal in feeler line 60 obtained from the primary liquid.

Figure 7:
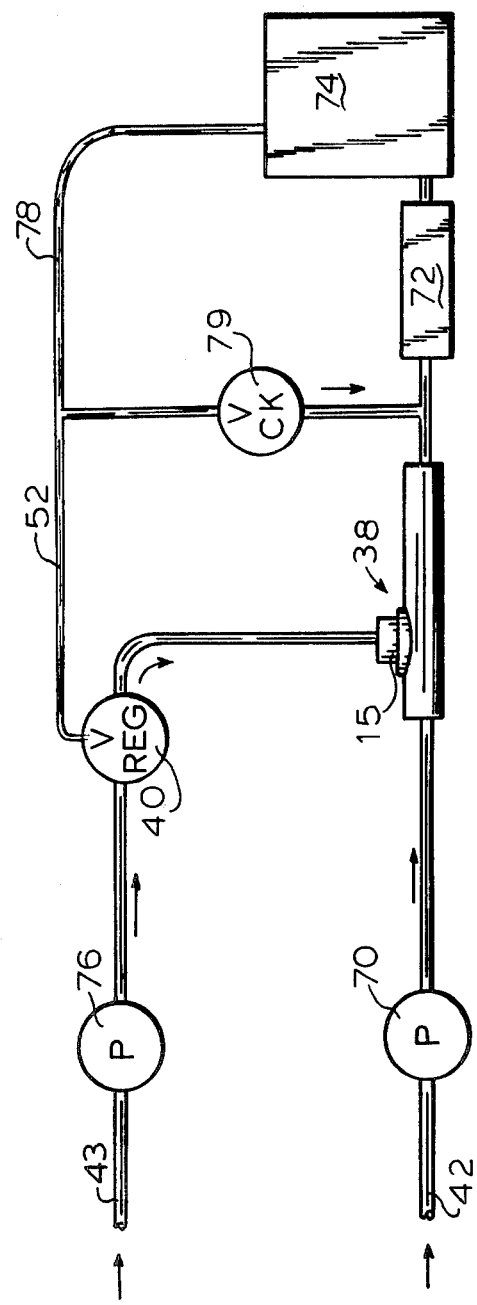
FIG. 7 is a schematic flow diagram including a metering-mixing device together with an emulsifier that forms part of a fuel system for an engine and in which the stagnation pressure of the secondary liquid is varied by the pressure of the return fuel from the engine.

In FIG. 7 a schematic flow diagram of a fuel system for an engine or boiler installation is shown. Oil flows in line 42, through a fuel pump 70, through the metering-mixing module 38, thence through a liquid-liquid emulsifier 72 such as that described in U.S. Pat. No. 3,937,445 and into an engine 74. Alcohol flows the pipe 43, through a pump 76, through a pressure regulating valve 40 and thence to the nozzle assembly 15 of the metering-mixing module 38. In this case the flow of alcohol is modulated from a signal obtained in the fuel return loop 78 from the engine, by means of the feeler line 52. A check valve 79 is employed in the fuel return loop 78 to prevent backflow.

It is important to the present invention and should be emphasized that although two liquids have been discussed, the process and apparatus will operate with a multiplicity of liquids. And as noted above, the invention works equally well with slurries, gels and thixiotropic materials. The metering-mixing systems may be passive or active, each having particular applications. Finally, although one embodiment has been shown, it should be appreciated that other passive or active devices may be designed which can produce the decrease in pressure and mass flow regimes.

Thus, in accordance with the above the aforementioned object are effectively attained.

Having thus described the invention, what is claimed is:

1. The method of obtaining a variable mixture of a primary liquid and secondary liquid in a predetermined proportional locus while the stagnation pressure and/or mass flow of the primary liquid vary comprising only the steps of:
   (a) decreasing the pressure of the primary liquid by passing it through a passive device having a passageway therein including a first section having a decreasing cross sectional area and a second section of substantially constant cross sectional area equal to the minimum cross sectional area of said first section; and
   (b) introducing the secondary liquid into the passive device at the second section.

2. The method in accordance with claim 1 wherein said secondary liquid is introduced into said passive device at a predetermined stagnation pressure.

3. The method in accordance with claim 1 wherein said secondary liquid is introduced into said passive device according to a varying stagnation pressure schedule.

4. The method in accordance with claims 1, 2 or 3 comprising the further step of permitting the mixture of said primary and secondary liquids to pass through a third section of said passageway having a cross sectional area increasing from that of said second section.

5. The method in accordance with claim 1 comprising the further step of controlling the flow of said primary liquid through a regulating valve.

6. The method in accordance with claims 1 or 5 comprising the step of controlling the flow of said secondary liquid through a regulating valve.

7. The method in accordance with claim 1 wherein said primary fluid regulating valve is controlled by a feedback loop from the outlet of said mixing apparatus.

* * * * *